(12) United States Patent
Dai (10) Patent No.: US 7,496,492 B2
(45) Date of Patent: Feb. 24, 2009

(54) SOFTWARE-AIDED STORAGE DEVICE EMULATION IN A PHYSICAL STORAGE DEVICE

(75) Inventor: Chung Lang Dai, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 628 days.

(21) Appl. No.: 10/652,450

(22) Filed: Aug. 29, 2003

(65) Prior Publication Data

US 2005/0049848 A1    Mar. 3, 2005

(51) Int. Cl.
G06F 9/455 (2006.01)

(52) U.S. Cl. .......................................... 703/24
(58) Field of Classification Search .................. 703/24
See application file for complete search history.

(56) References Cited

U.S. PATENT DOCUMENTS

| 5,721,880 | A  | * | 2/1998  | McNeill et al. ............... 703/25 |
| 5,758,050 | A  |   | 5/1998  | Brady et al.                         |
| 5,996,024 | A  |   | 11/1999 | Blumenau ................... 719/326  |
| 6,735,601 | B1 | * | 5/2004  | Subrahmanyam ........... 707/200      |
| 6,874,060 | B2 | * | 3/2005  | Blood et al. ................ 711/111 |
| 6,961,941 | B1 | * | 11/2005 | Nelson et al. ............... 719/319  |
| 2003/0142551 | A1 | * | 7/2003 | Green .................... 365/189.01  |
| 2003/0142552 | A1 |   | 7/2003 | Green                                 |
| 2003/0182455 | A1 | * | 9/2003 | Hetzler et al. .............. 709/250  |
| 2004/0064594 | A1 | * | 4/2004 | Pooni et al. .................... 710/1 |
| 2004/0078521 | A1 | * | 4/2004 | Hawks et al. .............. 711/118    |
| 2004/0138868 | A1 | * | 7/2004 | Kuznetsov et al. ............ 703/25   |
| 2007/0124455 | A1 | * | 5/2007 | Motoyama et al. .......... 709/224     |

OTHER PUBLICATIONS

Ashish Palekar et al.; "Design and implementation of a Linux SCSI target for storage area networks", Nov. 10, 2001, Proceedings of the 5th Annual Linux Showcase & Conference.*
Ashish A. Palekar, Robert D. Russell; "Design and implementation of a SCSI target for storage area networks", May 2001, Computer Science Dept., Univ. of New Hampshire.*
Judd Robbins; "Mastering DOS", 1988, second edition, Sybex, pp. 692-699.*
Abraham Silberschatz et al., "Operating System Concepts", fifth edition, 1999, John Wiley & Sons, pp. 432-433.*
Peter Norton, "The Peter Norton Programmer's Guide to the IBM PC", 1985, Microsoft Press, pp. 99-125, 328.*

* cited by examiner

*Primary Examiner*—Paul L Rodriguez
*Assistant Examiner*—Russ Guill
(74) *Attorney, Agent, or Firm*—Woodcock Washburn LLP (57) ABSTRACT

Mechanisms that allow a physical storage device that has storage capability (such as a hard disk, tape drive, tape changer, or read-write compact disk) to emulate one or more storage devices. A configuration interface receives configuration function calls that specify properties of the storage device to be emulated. A front end component receives network communications and extracts SCSI commands from the network communication. An emulation software component establishes a file within the physical storage device in response to the configuration function call, determines that the SCSI command is intended for the emulated storage device, and uses the properties and the file storage space that correspond to the emulated storage device to fulfill the SCSI command in a manner that emulates the fulfillment of the SCSI command on the emulated storage device.

34 Claims, 3 Drawing Sheets

SOFTWARE-AIDED STORAGE DEVICE EMULATION IN A PHYSICAL STORAGE DEVICE

BACKGROUND OF THE INVENTION

1. The Field of the Invention

The present invention relates to network communication technology. More specifically, the present invention relates to mechanisms for configuring a physical storage device on a network to emulate Small Computer System Interconnect (SCSI) devices with different physical properties.

2. Background and Related Art

Computing technology has transformed the way we work and play. In a typical configuration, a computing system is coupled through a local bus to a variety of hardware devices for optimal operation. Such devices may include, for example, magnetic and/or optical disk drives, printers, fax machines, scanners, cameras, or the like. The computing system communicates with each of the connected hardware devices using a standard communication protocol that is recognized by the hardware device.

One commonly used communication protocol for communication between a computing system and its various connected hardware devices is a parallel interface standard called "Small Computer System Interface" (SCSI for short). SCSI allows for effective block transfer of data between a computing system and its various peripheral devices. However, SCSI does have certain limitations. In particular, data transfer using SCSI is relatively slow compared to other data transfer mechanisms. Furthermore, the cable length of the SCSI is relatively short compared to expansive networks. Accordingly, the hardware devices typically have to be close to the computing system if SCSI is employed in its purest form.

More recently, SCSI devices have been connected to computing system over networks, rather than locally through a bus. Such network-connected SCSI devices allow for more flexible network topologies since the SCSI device may serve a number of computing systems and need not be locally connected to any computing system it serves. However, SCSI commands cannot be communicated over a network directly, without being encapsulated into formats compatible with network transfer. Accordingly, various mechanisms for communicating SCSI commands over a network have been developed.

One such mechanism is an improvement to SCSI is called "Internet SCSI" ("iSCSI" for short). iSCSI is a standard which allows standard SCSI commands and responses to be communicated over any IP-based network such as Ethernets and the Internet. The computing system includes an "initiator" (which may be hardware or software) which initiates communication with the target device using the iSCSI standard. Specifically, the SCSI message is fragmented if needed and then encapsulated with Internet Protocol (IP) headers, whereupon it is sent over the IP network. The target device then extracts and executes the SCSI command, and then returns the response, if any, using the iSCSI standard over the IP-based network. Another method for communicating SCSI commands over a network is called Fiber Channel.

It is sometimes advantageous for a device to emulate one or more SCSI devices or to have more than one device emulate a single SCSI device. For example, suppose that an Information Technology (IT) administrator has a one hundred gigabyte hard drive available, but has several storage needs. For example, the IT administrator may need ten hard disks, one for each client, a tape drive for nightly backup purposes. It would be much less expensive to have the one hundred gigabyte hard drive emulate the five different hard drives and the tape drive, rather than having to purchase these devices separately.

Accordingly, what would be advantageous are mechanisms in which one physical storage device emulates other storage devices.

BRIEF SUMMARY OF THE INVENTION

The foregoing problems with the prior state of the art are overcome by the principles of the present invention, which are directed towards mechanisms that allow a physical storage device that has storage capability (such as a hard disk, tape drive, tape changers, or read-write compact disk) to emulate one or more SCSI storage devices that may respond to SCSI commands. The physical storage device need not be of the same device type-as the storage device it emulates. For example, a disk drive may be used to emulate a tape drive. This gives greater flexibility into how peripheral storage devices are configured.

The physical storage device has three software components, a configuration interface, a front end component, and an emulation software component. The configuration interface receives configuration function calls that specify properties of the storage device to be emulated. A front end component receives network communications and extracts SCSI commands from the network communication. An emulation software component establishes a file within the physical storage device in response to the configuration function call. The component then determines that the SCSI command is intended for the emulated storage device. In response, the component uses the properties and the file storage space that correspond to the emulated storage device to fulfill the SCSI command in a manner that emulates the fulfillment of the SCSI command on the emulated storage device.

The physical storage device that performs the emulation need not be of the same storage type as the storage device being emulated. For instance, a disk driver may be used to emulate a tape drive, a tape changer, a read-write compact disk, or other types of storage devices. Similarly, tape drivers may be used to emulate disk drives, tape changers, read-write compact disks, or other storage devices. Tape changers may be used to emulate disk drives, tape drivers, read-write compact disks and other storage devices. Read-write compact disks may be used to emulate disk drives, tape drivers, tape changers, or other storage devices.

In addition to the flexibility of having one device type emulate another, the device types emulated by any given storage device may also differ from each other. For example, a storage device may emulate one or more or all of disk drives, tape drivers, tape changers, read-write compact disks, or other storage devices. Accordingly, the storage capability of entire networks may be more easily consolidated into fewer storage devices thereby giving more control to network administrators on how to manage storage requirements. Furthermore, storage costs may be significantly reduced since needed storage devices may be emulated, rather than purchased.

Additional features and advantages of the invention will be set forth in the description that follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The principles of the present invention relate to mechanisms that allow a physical storage device that has storage capability (such as a hard disk, tape drive, tape changer, or read-write compact disk) to emulate one or more storage devices. The physical storage device has three software components, a configuration interface, a front end component, and an emulation software component. The configuration interface receives configuration function calls that specify properties of the storage device to be emulated. A front end component receives network communications and extracts SCSI commands from the network communication. An emulation software component establishes a file within the physical storage device in response to the configuration function call, determines that the SCSI command is intended for the emulated storage device, and uses the properties and the file storage space that correspond to the emulated storage device to fulfill the SCSI command in a manner that emulates the fulfillment of the SCSI command on the emulated storage device.

Turning to the drawings, wherein like reference numerals refer to like elements, the invention is illustrated as being implemented in a suitable computing environment. The following description is based on illustrated embodiments of the invention and should not be taken as limiting the invention with regard to alternative embodiments that are not explicitly described herein.

In the description that follows, the invention is described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains them at locations in the memory system of the computer, which reconfigures or otherwise alters the operation of the computer in a manner well understood by those skilled in the art. The data structures where data are maintained are physical locations of the memory that have particular properties defined by the format of the data. However, while the invention is being described in the foregoing context, it is not meant to be limiting as those of skill in the art will appreciate that several of the acts and operations described hereinafter may also be implemented in hardware.

Figure 1:
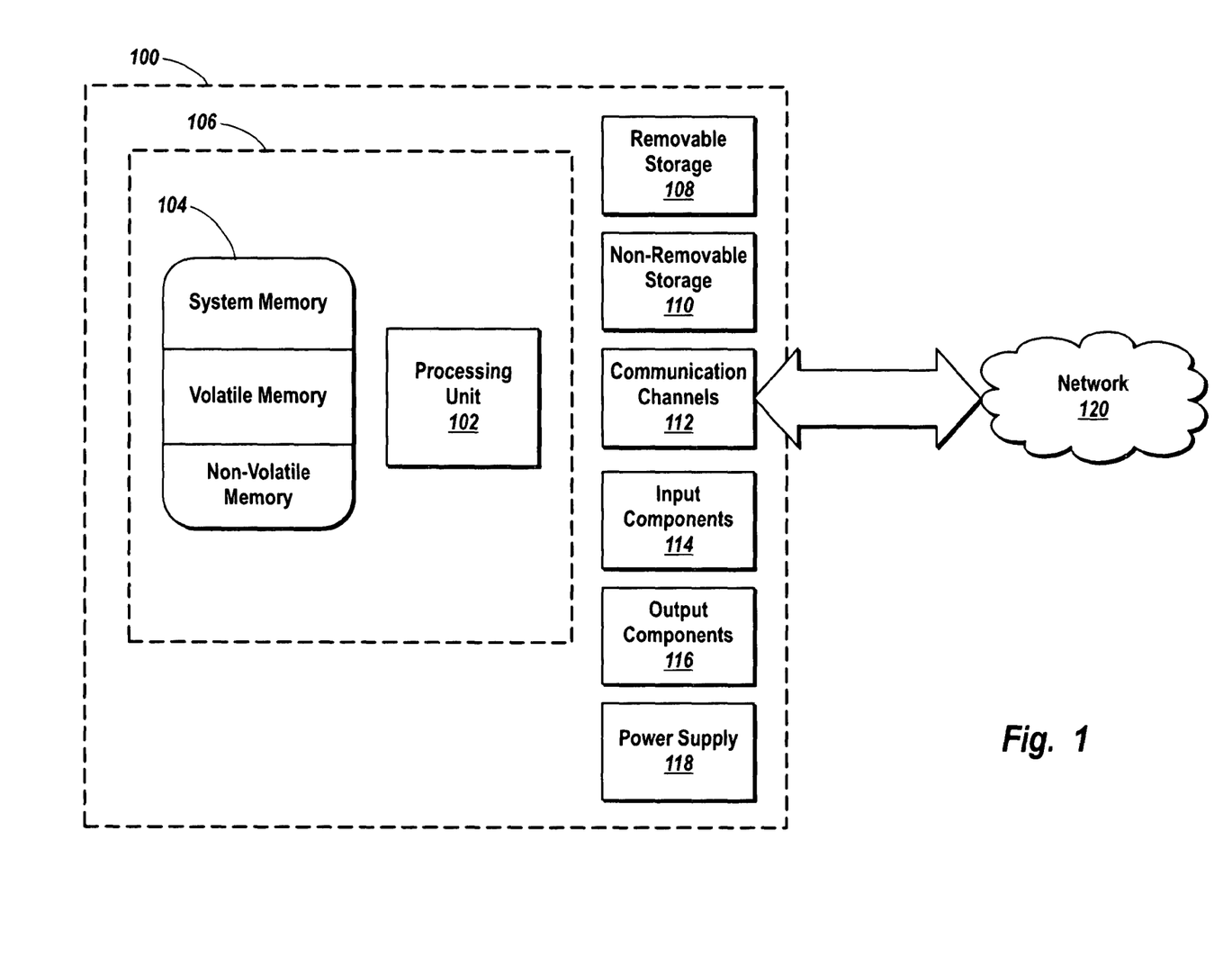
FIG. 1 illustrates a suitable computing system that may implement the features of the present invention.

For descriptive purposes, FIG. 1 shows a schematic diagram of an example computer architecture usable for these devices. The architecture portrayed is only one example of a suitable environment and is not intended to suggest any limitation as to the scope of use or functionality of the invention. Neither should the computing systems be interpreted as having any dependency or requirement relating to anyone or combination of components illustrated in FIG. 1.

The invention is operational with numerous other general-purpose or special-purpose computing or communications environments or configurations. Examples of well known computing systems, environments, and configurations suitable for use with the invention include, but are not limited to, mobile telephones, pocket computers, personal computers, servers, multiprocessor systems, microprocessor-based systems, minicomputers, mainframe computers, and distributed computing environments that include any of the above systems or devices.

In its most basic configuration, a computing system 100 typically includes at least one processing unit 102 and memory 104. The memory 104 may be volatile (such as RAM), non-volatile (such as ROM, flash memory, etc.), or some combination of the two. This most basic configuration is illustrated in FIG. 1 by the dashed line 106.

The storage media devices may have additional features and functionality. For example, they may include additional storage (removable and non-removable) including, but not limited to, PCMCIA cards, magnetic and optical disks, and magnetic tape. Such additional storage is illustrated in FIG. 1 by removable storage 108 and non-removable storage 110. Computer-storage media include volatile and non-volatile, removable and non-removable media implemented in any method or technology for storage of information such as computer-readable instructions, data structures, program modules, or other data. Memory 104, removable storage 108, and non-removable storage 110 are all examples of computer-storage media. Computer-storage media include, but are not limited to, RAM, ROM, EEPROM, flash memory, other memory technology, CD-ROM, digital versatile disks, other optical storage, magnetic cassettes, magnetic tape, magnetic disk storage, other magnetic storage devices, and any other media that can be used to store the desired information and that can be accessed by the computing system.

As used herein, the term "module" or "component" can refer to software objects or routines that execute on the computing system. The different components, modules, engines, and services described herein may be implemented as objects or processes that execute on the computing system (e.g., as separate threads). While the system and methods described herein are preferably implemented in software, implementations in software and hardware or hardware are also possible and contemplated.

Computing system 100 may also contain communication channels 112 that allow row the host to communicate with other devices. Communication channels 112 are examples of communications media. Communications media typically embody computer-readable instructions, data structures, program modules, or other data in a modulated data signal such as a carrier wave or other transport mechanism and include any information-delivery media. The term "modulated data signal" means a signal that has one or more of its characteristics set or changed in such a manner as to encode information in the signal. By way of example, and not limitation, communications media include wired media, such as wired networks and direct-wired connections, and wireless media such as acoustic, radio, infrared, and other wireless media. The term computer-readable media as used herein includes both storage media and communications media.

The computing system 100 may also have input components 114 such as a keyboard, mouse, pen, a voice-input component, a touch-input device, and so forth. Output components 116 include screen displays, speakers, printer, etc., and rendering modules (often called "adapters") for driving them. The computing system 100 has a power supply 118. All these components are well known in the art and need not be discussed at length here.

Figure 2:
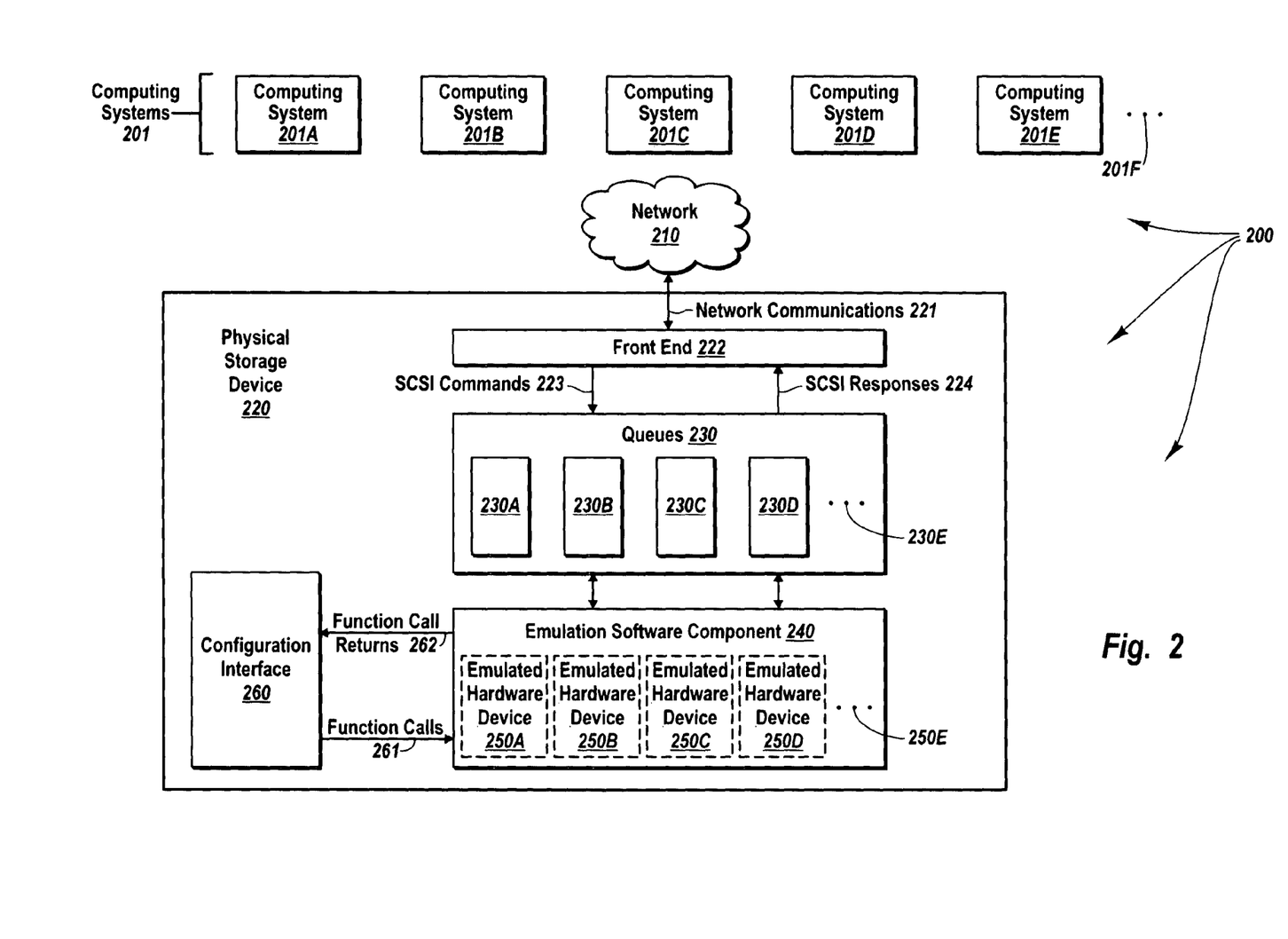
FIG. 2 illustrates a network environment in which the principles of the present invention may be employed including computing systems in networked communication with a physical storage device that is capable of emulating one or more physical SCSI devices.

FIG. 2 illustrates a network environment 200 in which the principles of the present invention may be employed. The network environment 200 includes a number of computing systems 201 that may communicate over a network 210 with a physical storage device 220. The network 210 may be, for example, the Internet, a Local Area Network, a Virtual Privacy Network (VPN), or any other network. There may be any number of computing systems 201 that may communicate with the physical storage device 220. However, FIG. 2 illustrates five computing systems 201A through 201E. There may be more computing systems (as represented by the horizontal ellipses 201F) or fewer computing systems. Even one computing system is possible.

Each computing system 201 may be structured as described above for the computing system 100 although that is by no means required. In that case, however, the computing system 100 may communicate with the physical storage device 220 over network 210 by using communication channels 112 in the manner described for communicate over network 120.

The physical storage device 220 may be, for example, a disk drive, a tape drive, a tape changer, a read-write compact disk, or any other storage device. The physical storage device 220 has associated processing ability that allows for the execution of software. This processing capability may be integrated within the physical storage device 220 or may be implemented by a computing system associated with the physical storage device 220. The software components running on the physical storage device 220 include a front end 222, queues 230, emulation software component 240, and configuration interface 260.

The configuration interface 260 may be, for example, a WINDOWS Management Instrumentation ("WMI" for short) interface. Briefly stated, the configuration interface 260 receives a configuration function call that specifies properties of a storage device to be emulated by the physical storage device. In other words, using the properties specified through the configuration interface 260, the emulation software component 240 is instructed on how to react to various scenarios such as, for example, how to simulate a disk drive using a file.

The front end component 222 is configured to receive network communications from the network 210. Such network communications may conform to the iSCSI, Fiber Channel, USB or IEEE 1394 protocols or any other protocol that may be used to encapsulate SCSI commands for transfer over a network. The front end component 222 then extracts the SCSI commands 223 from the network communication 221, and then provides the SCSI command via the queues 230 to the emulation software component 240. Upon completed execution of the SCSI command, SCSI responses 224 are returned to the front end component 222.

In one implementation, there is one queue dedicated for each emulated storage device. For example, the queues 230 includes queues 230A, 230B, 230C and 230D that correspond to emulated storage devices 250A, 250B, 250C, and 250D maintained by the emulation software component 240. Furthermore, other queues 230E may be used for yet other emulated hardware devices 250E. The emulation software component 240 takes the SCSI commands from the queues 230. In one example, the commands are taken from the queues 230 in any manner that guards against device starvation of any single emulated storage device. For example, the emulation software component 240 may take the SCSI commands from each queue in a round robin fashion.

The emulation software component 240 may be, for example, a Command Descriptor Block (or "CDB" engine) and actually performs the device emulation as configured through the configuration interface 260 and in response to SCSI commands received from the front-end 220 via the queues 230.

As previously mentioned, the physical storage device 220 may be a hard disk, a tape drive, a tape changer, a read-write compact disk, or any other storage device. Furthermore, the storage devices being emulated may also be a hard disk, a tape drive, a tape changer, a read-write compact disk, or any other storage device.

However, the physical storage device 220 need not be of the same device type as the storage device being emulated. For instance, a disk drive may be used to emulate a tape drive, a tape changer, a read-write compact disk, or other types of storage device. Similarly, tape drives may be used to emulate disk drives, tape changers, read-write compact disks, or other storage devices. Tape changers may be used to emulate disk drives, tape drivers, read-write compact disks and other storage devices. Read-write compact disks may be used to emulate disk drives, tape drivers, tape changers, or other storage devices.

In addition to the flexibility of having one device type emulate another, the device types emulated by any given storage device may also differ from each other. For example, a storage device may emulate one or more or all of disk drives, tape drivers, tape changers, read-write compact disks, or other storage devices. Accordingly, the storage capability of entire networks may be more easily consolidated into fewer storage devices thereby giving more control to network administrators on how to manage storage requirements. Furthermore, storage costs may be significantly reduced since needed storage devices may be emulated, rather than purchased.

Having now described the general structure of the network environment 200 and physical storage device 220 with respect to FIG. 2, a method 300 for the physical storage device to emulate one or more storage devices will now be described with respect to FIG. 3 while making frequent reference back to the elements illustrated in FIG. 2. The method 300 may be repeated for each storage device emulated by the emulation software component 220. Furthermore, for any given emulated storage device, the step for the physical storage device emulating the emulated storage device using the properties and the file (step 310) described below may be repeated for each received network communication that is intended for that emulated storage device.

Figure 3:
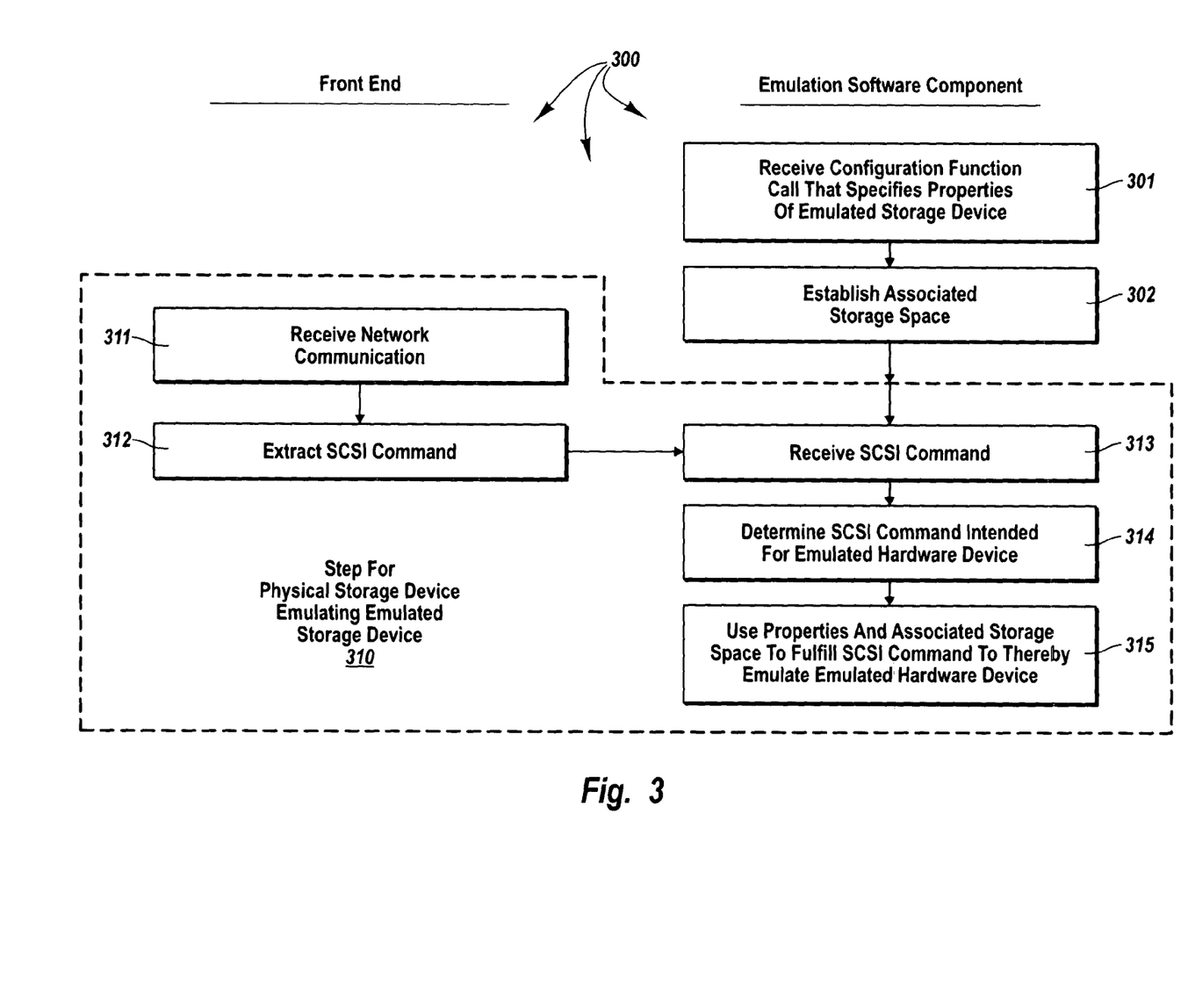
FIG. 3 illustrates a flowchart of a method for a physical storage device to emulate one or more SCSI devices in accordance with the principles of the present invention.

Referring to FIG. 3, some of the acts of the method 300 are performed by the front end component 222 as listed in the left column of FIG. 3 under the heading "Front End". Other acts of the method 300 are performed by the emulation software component 240 as represented in the right column of FIG. 3 under the heading "Emulation Software Component".

The emulation software component receives a configuration function call that specifies properties of a storage device to be emulated by the physical storage device (act 301). Referring to FIG. 2, this may be accomplished using the configuration interface 260. The function call may, for example, be a request to emulate a new storage device, or a request to set new properties for an existing emulated storage device. The following is an Application Program Interface (API) that may be used to create a new emulated device with specific properties.

```
void CreateDevice(
    [in, Description("create new SoftScsi device")] boolean CreateNew,
    [in, Description("device properties")] SoftScsiDeviceProperties
        Properties,
    [in, Description("device name")] string DeviceName
);
```

The CreateDevice method takes three input parameters. CreateNew is a Boolean value, which should be set to true to create a new emulated storage device. Properties is a data structure of type SoftScsiDeviceProperties and defines the properties of the emulated storage device. DeviceName is a string that defines the device name for the emulated storage device being created. When placing this API, the emulation software component 240 not only creates the new emulated storage device, but also verifies that the physical storage device 220 has sufficient resources to emulate the new device with the specified properties.

The following is a definition for the SoftScsiDeviceProperties Class.

```
class SoftScsiDeviceProperties {
    [read, Description("SCSI vendor ID"), maxlen(8), WmiDataId(1)] string VendorID;
    [read, Description("SCSI Product ID"), maxlen(16), WmiDataId(2)] string ProductID;
    [read, Description("SCSI Product RevisionLevel"), maxlen(4), WmiDataId(3)] string
        ProductRevisionLevel;
    [read, Description("device type"), DefineValues {"DIRECT_ACCESS_DEVICE"},
        ValueMap {"0x00"}, WmiDataId(4)] uint32 DeviceType;
    [read, Description("block size"), WmiDataId(5)] uint32 BlockSize;
    [read, Description("number of blocks"), WmiDataId(6)] uint64 NumberOfBlocks;
    [read, Description("total number of blocks"), WmiDataId(7)] uint64
        TotalNumberOfBlocks;
    [read, Description("Read Cache Enabled"), WmiDataId(8)] boolean
        ReadCacheEnabled;
    [read, Description("Write Cache Enabled"), WmiDataId(9)] boolean
        WriteCacheEnabled;
};
```

The first four fields; namely, the VenderID field, the ProductID field, the ProductRevisionLevel field, and the DeviceType field are standard SCSI properties for SCSI devices and specify the SCSI vendor ID, the SCSI product ID, the SCSI product revision level, and the SCSI device type, respectively, of the emulated storage device. Those of ordinary skill in the art of SCSI will be familiar with these fields.

The next three fields; namely, the BlockSize field, the NumberOfBlocks field, and the TotalNumberOfBlocks field, define the general memory configuration of the device to be emulated. The BlockSize field defines the block size of the device to be emulated. The TotalNumberOfBlocks field defines the total number of those blocks that the device to be emulated may be configured to use. The NumberOfBlocks field defines the number of blocks that the device to be emulated is currently configured to use. The NumberOfBlocks field is less that the TotalNumberOfBlocks field.

The last two fields; namely, the ReadCacheEnabled and WriteCacheEnabled field are Boolean values that specify whether or not the device to be emulated has a read cache or a write cache capability, respectively.

The following API is used to set or change the properties of a previously created emulated storage device.

```
void SetDeviceProperties(
    [in, Description("device properties")] SoftScsiDeviceProperties
        Properties,
    [in, Description("device name")] string DeviceName
);
```

The SetDeviceProperties method also uses the SoftScsiDeviceProperties data structure to define the properties. In this case, however, the method inputs the device name of the previously created emulated storage device.

There are other useful APIs that may be placed through the configuration interface 260. The following API may be used to get properties of a previously created emulated device.

```
void GetDeviceProperties(
    [in, Description("device name")] string DeviceName,
    [out, Description("indicate whether the device is valid")] boolean
        DeviceValid,
    [out, Description("device properties")] SoftScsiDeviceProperties
        Properties,
    [out, Description("device unique name")] string SoftScsiUniqueName
);
```

The emulated device for which the properties are being queried are defined by the device name. In return, the properties are provided in the SoftScsiDeviceProperties structure associated with that device name. In addition, a Boolean value DeviceValid is returned to indicate whether or not the device name is valid. Optionally, a device unique name is returned as well.

The following API may be placed through the configuration interface to obtain usage data (e.g., number of bytes written and read) associated with a particular emulated device.

```
void GetDevicePerformanceData(
    [in, Description("device name")] string DeviceName,
    [out, Description("number of data bytes written to the device")] uint32
        BytesWritten,
    [out, Description("number of data bytes read from the device")]
        uint32 BytesRead,
);
```

The following API may be placed through the configuration interface to determine how much storage space is needed to properly emulate the storage device.

```
void LogicalUnitSize(
    [in, Description("device properties")] SoftScsiDeviceProperties
    Properties,
    [in, Description("device name")] string DeviceName,
    [out, Description("physical Block Size")] uint32 PhysicalBlockSize,
    [out, Description("device total byte size")] uint64 TotalSize
);
```

The LogicalUnitSize method determines from the device properties and the device name, the physical block size and the total byte size needed to properly emulate the storage device.

Returning to FIG. 3, in response to having received the function call, the emulation software component establishing storage space within the physical storage device associated with the device to be emulated (act 302). For example, the storage space may be set apart for the device to be emulated in the form of a file. The file size would be equal to the product of the block size times the total number of blocks, plus some overhead storage. The overhead storage would include tracking data that correlates file memory locations to particular blocks of the device to be emulated, and tracks which blocks may or may not be used. The storage space may be established apart from using a file as well, in which case the tracking data would track which physical storage locations correspond to which blocks of the emulated storage device.

The use of a file to emulate a storage device is advantageous because files may be conveniently backed up, resized, and otherwise maintained. In one embodiment, the emulation software component 240 only uses files to emulated storage devices with another emulation software component dedicated to emulating storage devices without using files.

If the properties indicated that the emulated device has read cache or write cache capability, the emulation software component 240 may instruct the file system to enabled read or write cache for the file. Alternatively or in addition, the emulation software component 240 may maintain its own cache memory.

The method also includes a functional, result-oriented step for the physical storage device emulating the emulated storage device using the properties and the file (step 310). This step may include any corresponding acts for accomplishing this result. However, in the illustrated embodiment, the step 310 includes corresponding acts 311 through 315.

Specifically, the front end receives a network communication (act 311). As previously mentioned, the network communication may be formulated using any protocol which allows for transfer over a network and that also allows for the inclusion of data such as SCSI commands. Such protocols may include, for example, iSCSI, Fiber Channel, USB, IEEE 1394, or the like. The front end component then extracts a SCSI command from the network communication (act 312).

The emulation software component then receives the extracted SCSI command (act 313). For example the front end component 222 may place a function call to the emulation software component 240 at least indirectly through the queues 230. Once the function call enters the queues 230, the queue may return a request pending message. Once the function call is completed by the emulation software component 240, the emulation software component 240 may return a "request completed" message to the front end component 222.

In particular, the following API may be used to submit a SCSI request to the emulation software component.

VOID (*SubmitRequest) (IN PSOFTSCSI_REQUEST SoftScsiRequest);

The SubmitRequest method is used to submit any SCSI request to the emulation software component. When the SCSI request is complete, the CompleteRequest callback provided when the SoftScsi adapter (described further below) is opened will be called with the SoftScsi request. The request is defined by a data structure of the class PSOFTSCSI_REQUEST. The following defines that data structure class.

```
typedef struct _SOFTSCSI_REQUEST {
    // only these fields are required in this embodiment.
    // USHORT Length;              // offset 0
    // UCHAR CdbLength;            // offset a
    // UCHAR SenseInfoBufferLength; // offset b
    // ULONG DataTransferLength;   // offset 10
    // PVOID DataBuffer;           // offset 18
    // PVOID SenseInfoBuffer;      // offset 1c
    // UCHAR Cdb[16];              // offset 30
    // all other fields may be zero
    //
    SCSI_REQUEST_BLOCK Srb;
    // request attributes
    //
    union {
        //
        // ISCSI SCSI Command Attribute
        // can be any one of these:
        //   ISCSI_TASKATTR_UNTAGGED
        //   ISCSI_TASKATTR_SIMPLE
        //   ISCSI_TASKATTR_ORDERED
        //   ISCSI_TASKATTR_HEADOFQUEUE
        //   ISCSI_TASKATTR_ACA
        ULONG iScsiTagQueue:3;
        //
        // 1 if the SCSI CDB is to write to the device
        //
        ULONG WriteToDevice:1;
    };
    //
    // Data buffer MDL
    //
    PMDL         DataBufferMdl;
    //
    // Helper IRP. This IRP is given to softscsi for submitting the scsi
    //   command
    // to its device stack. the stack size must be at least as large as the
    //   stack size
    // specified in the SoftScsi interface table
    //
    PIRP         Irp;
    //
    // SoftScsi Logical Unit Handle
    //
    SOFTSCSI_LU_HANDLE SoftScsiLuHandle;
} SOFTSCSI_REQUEST, *PSOFTSCSI_REQUEST;
```

The SOFTSCSI_REQUEST data structure provides a standard way to submit a SCSI request to the emulation software component 240. The iScsiTagQueue value is a direct mapping of the iSCSI flags defined in the iSCSI specification to minimize the workload required to build SCSI requests. The DataBufferMdl field is the system MDL that describes the data buffer in the SCSI request. The Irp is a helper IRP provided by the request owner.

In addition, the following API may be called by the front end component 222 to activate the emulation software component 240 during, for example, initialization.

```
NTSTATUS
(*OpenAdapter) (
    IN PDEVICE_OBJECT              SoftScsiDeviceObject,
    IN SOFTSCSI_COMPLETE_REQUEST   CompleteRequest,
    OUT SOFTSCSI_ADAPTER_HANDLE SoftScsiAdapterHandle
)
```

This function is to open a handle to the emulation software component and it provides a chance for the emulation software component to initialize. This function is called for each instance of the emulation software component. SoftScsiDeviceObject is the device object of the emulation software component. CompleteRequest is a callback for completing a SCSI request submitted via SubmitRequest. SoftScsiAdapterHandle is a handle to the emulation software component.

The following API may be called by the front end component to close an emulation software component and clean up associated resources.

```
VOID
(*CloseAdapter) (
    IN    SOFTSCSI_ADAPTER_HANDLE    SoftScsiAdapterHandle
);
```

The emulation software component might be closed when, for example, the network connection with any of the computing systems 201 is lost.

The following API may be called by the front end component to open an emulated device that is already created so that SCSI commands may be issued to that device.

```
SOFTSCSI_DEVICE_HANDLE
(*OpenDevice) (
    IN      SOFTSCSI_ADAPTER_      SoftScsiAdapterHandle, IN
            HANDLE
            PUNICODDE_STRING       DeviceName,
    IN OUT  PULONG                 NumberOutstandingRequest,
    OUT     CHAR    TargetName[MAX_TARGET_NAME_LENGTH],
    OUT     PULONG                 BufferAlignmentRequirement
);
```

SoftScsiAdapterHandle is a handle to an emulation software component. DeviceName is the name of the device to open. NumberOutstandingRequest specifies the number of requests that may be submitted to the device at any time. As both an input and an output parameter, NumberOutstandingRequest allows the caller to negotiate the number of outstanding requests with the emulation software component. The returned value is always equal to or less than the caller's value. TargetName is the non-volatile name of the device. BufferAlignmentRequirement specifies the data buffer alignment requirement for the data buffers submitted with the requests. StackSize is the extra IRP stack location of the IRP in every request.

The following API closes a device so that it can no longer accept SCSI commands where SoftScsiDeviceHandle is a handle for the emulated storage device.

```
VOID
(*CloseDevice) (
    IN    SOFTSCSI_DEVICE_HANDLE    SoftScsiDeviceHandle
);
```

The following API flushes all pending requests.

```
VOID
(*FlushAllRequests) (
    IN    SOFTSCSI_DEVICE_HANDLE    SoftScsiDeviceHandle
);
```

Upon receiving the SCSI command, the emulation software component determines that the SCSI command is intended for the emulated storage device (act 314). This may be accomplished by reading the device name from the SCSI command.

Then, the emulation software component uses the properties and the file storage space that correspond to the emulated storage device to fulfill the SCSI command in a manner that emulates the fulfillment of the SCSI command on the emulated storage device (act 315). For example, when using a file to emulate a storage device in which segments are read from or written to the emulated device one block at a time, the tracking data may be used to translate the block identifier to a particular memory portion of the file. The emulation software component may then read from or write to the corresponding file memory portion. If the request is to query regarding properties of the file, those properties may be read from the overhead portion of the file.

Accordingly, a mechanism has been described in which a physical storage device may be used to emulate different storage devices of different device types. This allows for flexibility and reduced costs in configuring storage by allowing IT administrators to centralize storage regardless of the type of storage needed.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes, which come within the meaning and range of equivalency of the claims, are to be embraced within their scope.

What is claimed and desired secured by United States Letters Patent is:

1. In a physical storage device that has storage capability and a front end capable of receiving communications from a computing system and extracting small computer system interface (SCSI) commands from the communications, a method for the physical storage device emulating one or more storage devices that may respond to the SCSI commands, the method comprising the following:

an act of an emulation software component receiving a function call that specifies properties of a storage device to be emulated by the physical storage device, the function call being in a format specified by an application programming interface (API), and the parameters of the function call comprising a boolean value, Create, a property class, Properties, and a device name string, wherein Properties comprises a SCSI vendor ID, a device type, a block size, and a total number of blocks, and wherein the vendor ID and the device type are standard SCSI properties and wherein block size and total number of blocks define the memory configuration of a device to be emulated;

in response to having received the function call, an act of the emulation software component establishing a file within the physical storage device, the file having an associated file storage space of at least the size of the emulated storage device, and the file being associated with the emulated storage device in a manner that reserves within the physical storage device the total size of the emulated storage device, the total size being given, at least in part, by the block size and the total number of blocks;

an act of the front end receiving a network communication;

an act of the front end extracting a SCSI command from the network communication;

the front end providing the SCSI command to a queue dedicated to the emulated storage device;

an act of the emulation software component taking the SCSI command from the queue; and an act of the emulation software component fulfilling the SCSI command in a manner that emulates fulfillment of the SCSI command on the emulated storage device.

2. A method in accordance with claim 1, wherein the network communication is an internet small computer system interface (iSCSI) communication.

3. A method in accordance with claim 1, wherein the network communication is a Fiber Channel communication.

4. A method in accordance with claim 1, wherein the network communication is a Universal Serial Bus (USB) communication.

5. A method in accordance with claim 1, wherein the properties of the emulated storage device includes a product revision level of the emulated storage device.

6. A method in accordance with claim 5, wherein the properties of the emulated storage device include a total number of blocks of the emulated storage device, wherein the act of the emulation software component establishing the file comprises the following:

an act of the emulation software component associating storage space within the file to a block for each of the total number of blocks.

7. A method in accordance with claim 6, wherein the properties of the emulated storage device include a number of blocks that the emulated storage device is configured to use, wherein the act of the emulation software component establishing the file comprises the following:

an act of the emulation software component tracking which of the blocks of the file may be used.

8. A method in accordance with claim 1, wherein the properties of the emulated storage device include a boolean value indicating whether a read cache is enabled.

9. A method in accordance with claim 1, wherein the properties of the emulated storage device include a device name, further comprising determining that the SCSI command is intended for the emulated storage device.

10. A method in accordance with claim 1, wherein the physical storage device is a hard disk.

11. A method in accordance with claim 10, wherein the emulated storage device is a hard disk.

12. A method in accordance with claim 10, wherein the emulated storage device is a tape drive.

13. A method in accordance with claim 10, wherein the emulated storage device is a tape changer.

14. A method in accordance with claim 10, wherein the emulated storage device is a read-write compact disk.

15. A method in accordance with claim 1, wherein the physical storage device is a tape drive.

16. A method in accordance with claim 15, wherein the emulated storage device is a hard disk.

17. A method in accordance with claim 15, wherein the emulated storage device is a tape drive.

18. A method in accordance with claim 15, wherein the emulated storage device is a tape changer.

19. A method in accordance with claim 15, wherein the emulated storage device is a read-write compact disk.

20. A method in accordance with claim 1, wherein the physical storage device is a tape changer.

21. A method in accordance with claim 20, wherein the emulated storage device is a hard disk.

22. A method in accordance with claim 20, wherein the emulated storage device is a tape drive.

23. A method in accordance with claim 20, wherein the emulated storage device is a tape changer.

24. A method in accordance with claim 20, wherein the emulated storage device is a read-write compact disk.

25. A method in accordance with claim 1, wherein the physical storage device is a read-write compact disk.

26. A method in accordance with claim 25, wherein the emulated storage device is a hard disk.

27. A method in accordance with claim 25, wherein the emulated storage device is a tape drive.

28. A method in accordance with claim 25, wherein the emulated storage device is a tape changer.

29. A method in accordance with claim 25, wherein the emulated storage device is a read-write compact disk.

30. A method in accordance with claim 1, wherein the properties of the emulated storage device include whether or not the emulated storage device is cache enabled.

31. The method of claim 1 wherein the function call is CreateDevice, which specifies that a particular device is to be emulated.

32. The method of claim 1 further comprising receiving a SetDeviceProperties function call to change the properties of a previously created emulated storage device.

33. A computer program product comprising one or more computer-readable storage media having computer instructions which, when executed by one or more computer processors, perform the method of claim 1.

34. A computer program product in accordance with claim 33, wherein the one or more computer-readable storage media further have stored thereon computer-executable instructions that, when executed by the one or more processors, cause the front end to perform the following:

receive function calls defined by the application programming interface (API) comprising CreateDevice, SetDeviceProperties, and GetDeviceProperties;

wherein CreateDevice comprises a boolean parameter, a class parameter, and a string parameter and specifies that a particular device is to be emulated;

wherein SetDeviceProperties comprises a class parameter and a string parameter and is used to change the properties of a previously created emulated storage device; and wherein GetDeviceProperties comprises two string parameters, a class parameter, and a boolean parameter and is used to get the properties of a previously created emulated storage device.

* * * * *

UNITED STATES PATENT AND TRADEMARK OFFICE
CERTIFICATE OF CORRECTION

| | | |
|---|---|---|
| PATENT NO. | : 7,496,492 B2 | Page 1 of 1 |
| APPLICATION NO. | : 10/652450 | |
| DATED | : February 24, 2009 | |
| INVENTOR(S) | : Chung Lang Dai | |

It is certified that error appears in the above-identified patent and that said Letters Patent is hereby corrected as shown below:

In column 5, line 56, after "communications" insert -- 221 --.

Signed and Sealed this
Tenth Day of May, 2011

David J. Kappos
*Director of the United States Patent and Trademark Office*